US008385281B2

(12) United States Patent
Pan et al.

(10) Patent No.: US 8,385,281 B2
(45) Date of Patent: Feb. 26, 2013

(54) METHOD AND APPARATUS FOR COMPONENT CARRIER AGGREGATION IN WIRELESS COMMUNICATIONS

(75) Inventors: Kyle Jung-Lin Pan, Smithtown, NY (US); Jean-Louis Gauvreau, La Prairie, CA (US); Guodong Zhang, Syosset, NY (US); Philip J. Pietraski, Huntington Station, NY (US); Sung-Hyuk Shin, Northvale, NJ (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 145 days.

(21) Appl. No.: 12/696,928

(22) Filed: Jan. 29, 2010

(65) Prior Publication Data

US 2010/0303011 A1  Dec. 2, 2010

Related U.S. Application Data

(60) Provisional application No. 61/148,696, filed on Jan. 30, 2009, provisional application No. 61/149,265, filed on Feb. 2, 2009.

(51) Int. Cl.
  *H04W 4/00* (2009.01)
  *H04J 3/00* (2006.01)
(52) U.S. Cl. .......... 370/329; 370/336; 370/345
(58) Field of Classification Search ........... 370/328, 370/329, 336, 345
  See application file for complete search history.

(56) References Cited

U.S. PATENT DOCUMENTS

| 2009/0088148 A1* | 4/2009 | Chung et al. | 455/423 |
| 2009/0154607 A1* | 6/2009 | Lindoff et al. | 375/341 |
| 2009/0209247 A1* | 8/2009 | Lee et al. | 455/422.1 |

OTHER PUBLICATIONS

Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).
Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.5.0 (Dec. 2008).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.0.0 (Dec. 2009).
3GPP ($3^{rd}$ Generation Partnership Project), Texas Instruments, "Issues on Carrier Aggregation for Advanced E-UTRA", R1-090280, 3GPP TSG RAN WG1 #55bis, Ljubljana, Slovenia, Jan. 12-16, 2009, 6 pages.
3GPP ($3^{rd}$ Generation Partnership Project), Nortel Networks, "Support of Wider Bandwidth for LTE-Advanced", R1-084474, TSG-RAN1 #55, Prague Czech, Nov. 10-14, 2008, 10 pages.

(Continued)

*Primary Examiner* — Ronald Abelson
(74) *Attorney, Agent, or Firm* — Condo Roccia LLP

(57) ABSTRACT

A wireless transmit/receive unit (WTRU) receives a downlink subframe having multiple component carriers, each component carrier having control information encoded in a physical downlink control channel (PDCCH). The WTRU performs a blind decoding of control information in a first PDCCH located within a first component carrier to obtain a location of a second PDCCH located within a second component carrier, where the location of the second PDCCH is relative to a location of the first PDCCH as control channel element offset. The WTRU decodes the second PDCCH at the obtained location.

24 Claims, 7 Drawing Sheets

OTHER PUBLICATIONS

3GPP (3$^{rd}$ Generation Partnership Project), ZTE, "General Control Channel Design for LTE-A", R1-082848, 3GPP TSG-RAN Wg1 #54, Jeju, Korea, Aug. 18-22, 2008, 4 pages.

3GPP (3$^{rd}$ Generation Partnership Project), ZTE, "Downlink Data and Control Structure for LTE-A", R1-090084, 3GPP TSG-RAN WG1 #55bis, Ljubljana, Slovenia, Jan. 12-16, 2009, 4 pages.

* cited by examiner

METHOD AND APPARATUS FOR COMPONENT CARRIER AGGREGATION IN WIRELESS COMMUNICATIONS

CROSS REFERENCE TO RELATED APPLICATIONS

This application claims the benefit of U.S. provisional application Nos. 61/148,696 filed on Jan. 30, 2009, and 61/149,265 filed on Feb. 2, 2009, which are incorporated by reference as if fully set forth.

FIELD OF INVENTION

This application is related to wireless communications.

BACKGROUND

Many wireless communication systems utilize a downlink (DL) transmission scheme based on an orthogonal frequency division multiple access (OFDMA) air interface. One example of such a communication system is the 3GPP long term evolution (LTE) system. In LTE, for example, wireless transmit/receive units (WTRUs) receive their data (and in some cases their control information) on the physical downlink shared channel (PDSCH). The transmission of the PDSCH is scheduled and controlled by an evolved Node-B (eNB) using the so-called downlink scheduling assignment, which is carried on a physical downlink control channel (PDCCH). As part of the downlink scheduling assignment, the WTRU receives control information on the modulation and coding set (MCS), and a downlink resource allocation (i.e., the indices of allocated resource blocks). The WTRU receives its PDSCH on allocated downlink resources with corresponding MCS.

In order to further improve achievable throughput and coverage of OFDMA-based radio access systems, carrier aggregation may be used. In the LTE advance (LTE-A) system, for example, carrier aggregation is supported and the PDSCH can be transmitted on more than one assigned carrier. Accordingly, PDCCHs should be able to carry the control information for the carriers that are assigned for PDSCH transmission. If there are M carriers, there should be M sets of control information for PDSCH transmission. Each set of control information can be carried by one PDCCH, which is encoded separately from other PDCCH. In this case, there are M PDCCHs for M carriers. The encoded PDCCHs can be transmitted on one or multiple carriers. Alternatively, M set of control information can be encoded jointly and carried by one single joint PDCCH. In this case, there is only one PDCCH but with a larger size for downlink control information (DCI) format. The joint PDCCH can then be transmitted in one or multiple carriers.

In LTE-A, several carriers can be aggregated. There are two possible schemes to encode the PDCCH, namely separate coding and joint coding of the PDCCH. In separate coding of the PDCCH, each PDCCH is encoded separately from one another regardless of the number of carriers being aggregated. It is simple, straightforward and backward compatible. However, the scheme has very high blind decoding complexity, which increases power consumption linearly with number of carriers being aggregated, particularly if PDCCHs are transmitted in all carriers. Schemes proposed for the downlink control channel in LTE-A must be backward compatible.

In joint coding, several PDCCHs are jointly encoded. By doing so, some overhead can be reduced, such as cyclic redundancy check (CRC) bits. However, joint coding of PDCCHs may require several DCI formats of different sizes, which increases the blind decoding complexity. For example, if dynamic DCI format is used, depending on the number of assigned carriers, different DCI formats should be used. One DCI format may be used for one carrier that is assigned; a different DCI format is used for two carriers that are assigned. Another DCI format is used for three carriers that are assigned, and so on. As a result, M DCI formats of different lengths are required for M carriers that are configured.

SUMMARY

A wireless transmit/receive unit (WTRU) receives a downlink subframe having multiple component carriers, each component carrier having control information encoded in a physical downlink control channel (PDCCH). The WTRU performs a blind decoding of control information in a first PDCCH located within a first component carrier to obtain a location of a second PDCCH located within a second component carrier, where the location of the second PDCCH is relative to a location of the first PDCCH as control channel element offset. The WTRU decodes the second PDCCH at the obtained location.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (WTRU), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
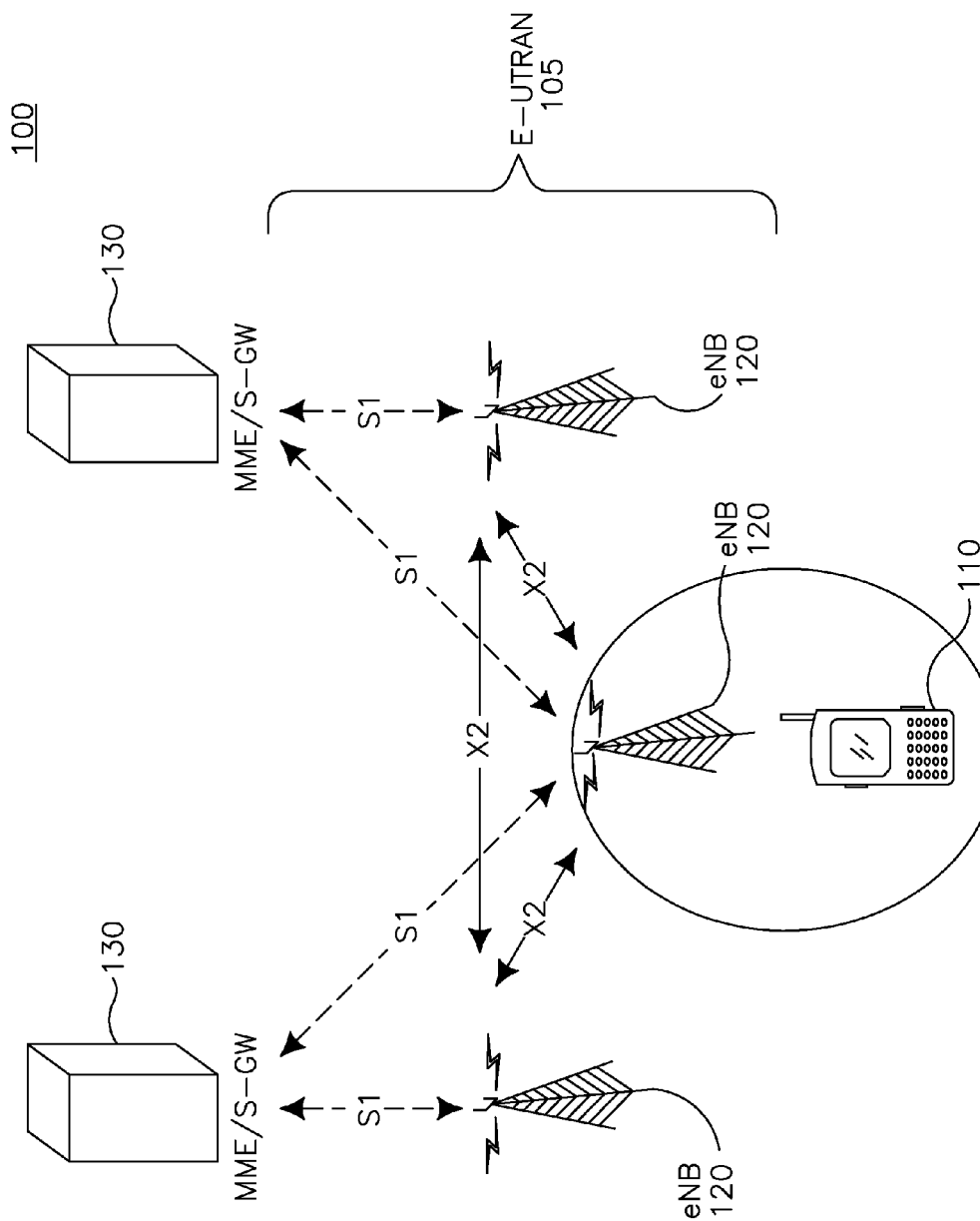
FIG. 1 shows an E-UTRAN wireless communication network including a wireless transmit/receive unit (WTRU), base stations and serving gateways.

FIG. 1 shows a Long Term Evolution (LTE) wireless communication system/access network 100, which includes an Evolved-Universal Terrestrial Radio Access Network (E-UTRAN) 105. The E-UTRAN 105 includes several evolved Node Bs (eNBs) 120. The WTRU 110 is in communication with an eNB 120. The eNBs 120 interface with each other using an X2 interface. Each of the eNBs 120 interface with a Mobility Management Entity (MME)/Serving GateWay (S-GW) 130, through an S1 interface. Although a single WTRU 110 and three eNBs 120 are shown in FIG. 1, it should be apparent that any combination of wireless and wired devices may be included in the wireless communication system/access network 100.

Figure 2:
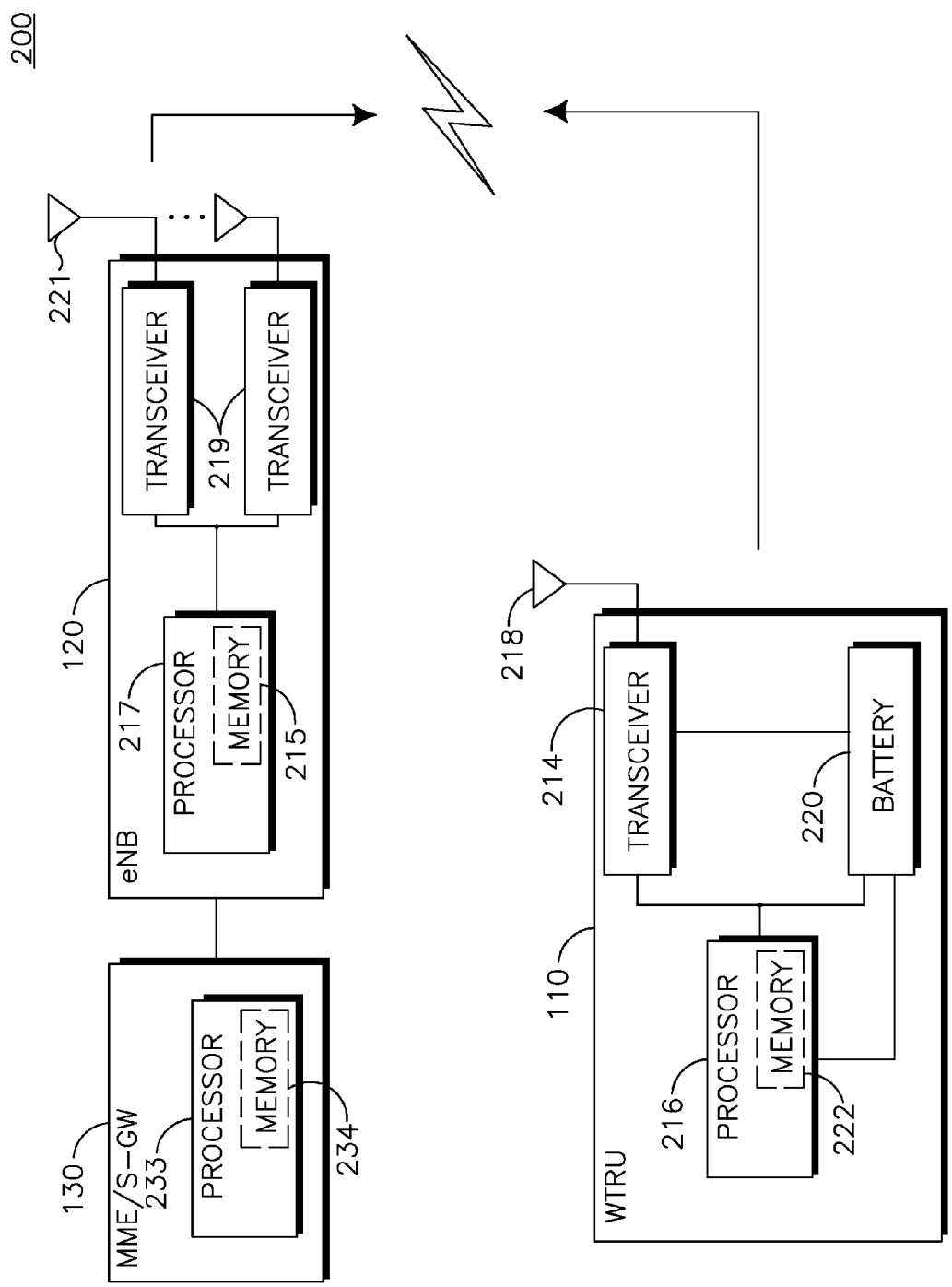
FIG. 2 shows a block diagram of a WTRU, a base station and a serving gateway.

FIG. 2 is an example block diagram 200 of an LTE wireless communication system 200, including the WTRU 110, the eNB 120, and the MME/S-GW 130. As shown in FIG. 2, the WTRU 110, the eNB 120 and the MME/S-GW 130 are configured to perform component carrier aggregation.

In addition to the components that may be found in a typical WTRU, the WTRU 110 includes a processor 216 with an optional linked memory 222, at least one transceiver 214, an optional battery 221, and an antenna 218. The processor 216 is configured to perform component carrier aggregation. The transceiver 214 is in communication with the processor 216 and antenna 218 to facilitate the transmission and reception of wireless communications. In case a battery 220 is used in WTRU 110, it powers the transceivers 214 and the processor 216.

In addition to the components that may be found in a typical eNB, the eNB 120 includes a processor 217 with an optional linked memory 215, transceivers 219, and antennas 221. The processor 217 is configured to perform component carrier aggregation. The transceivers 219 are in communication with the processor 217 and antennas 221 to facilitate the transmission and reception of wireless communications. The eNB 120 is connected to the Mobility Management Entity/Serving GateWay (MME/S-GW) 130 which includes a processor 233 with a optional linked memory 234.

Hereafter, the term PDCCH may refer to either a PDCCH or a DCI contained within a PDCCH. The terms PDCCH, and DCI, may be used to represent either.

Figure 3:
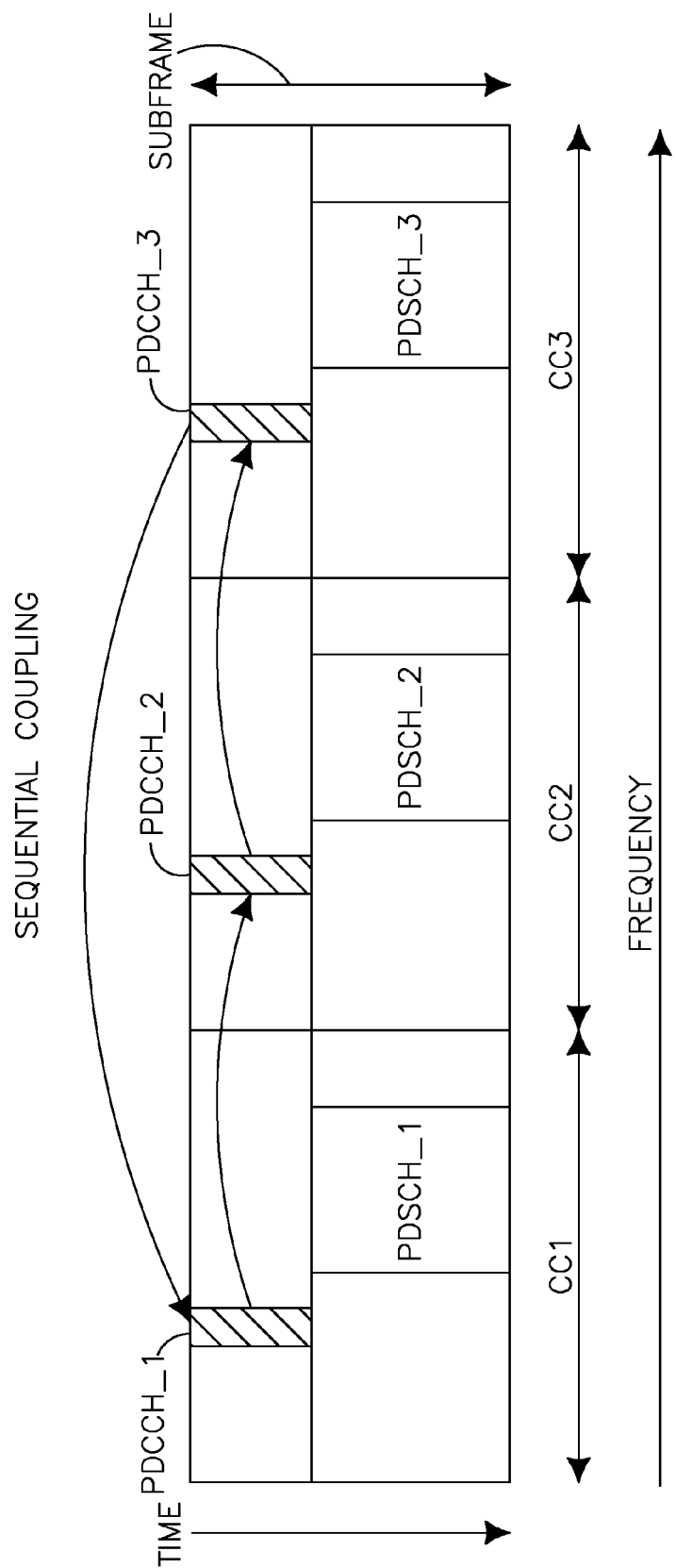
FIG. 3 shows a diagram of sequential coupling of physical downlink control channel locations in aggregated component carriers defined for a subframe.

FIG. 3 shows an example component carrier aggregation scheme in which three component carriers CC1, CC2 and CC3 are defined in a DL subframe, each component carrier having a separate coding of a PDCCH and a PDSCH. The eNB 120 defines component carrier aggregation for CC1, CC2 and CC3, whereby the respective PDCCH locations for PDCCH_1, PDCCH_2 and PDCCH_3 are coupled sequentially. For example, the PDCCH_1 location in CC1 is coupled to the PDCCH_2 location of CC2, which is coupled to the PDCCH_3 location of CC3, which is coupled to the PDCCH_1 location of CC1, such that the control information in PDCCH_1 points to the location of PDCCH_2, the control information in PDCCH_2 points to the location of PDCCH_3, and the control information in PDCCH_3 points to the location of PDCCH_1. Various methods of coupling by pointers are described below in further detail.

Figure 4:
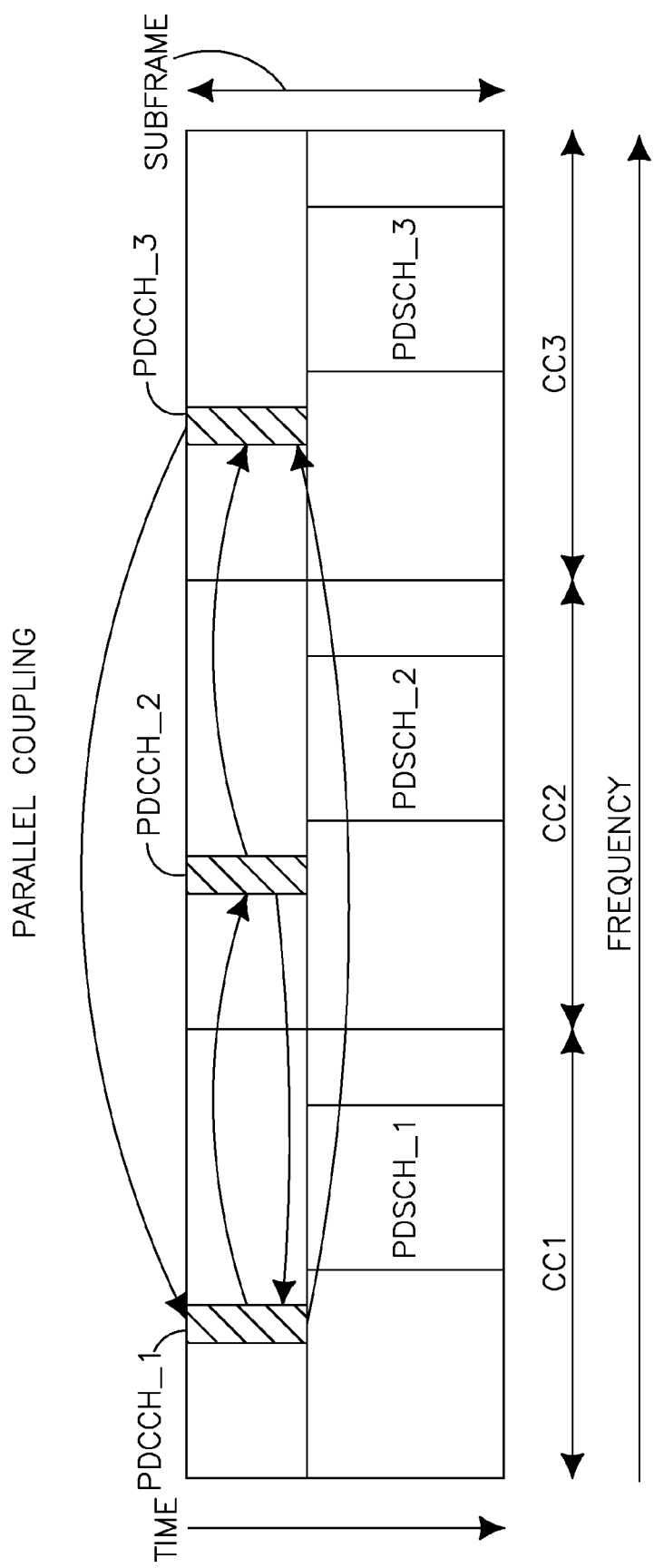
FIG. 4 shows a diagram of parallel coupling of physical downlink control channel locations in aggregated component carriers defined for a subframe.

FIG. 4 shows another example component carrier aggregation scheme in which the three component carriers CC1, CC2 and CC3 are defined in a DL subframe, each component carrier having a separate coding of a PDCCH and a PDSCH. In this case, the PDCCH locations in each component carrier are coupled in parallel. For example, the PDCCH_1 location in CC1 is coupled to both the PDCCH_2 location in CC2 and the PDCCH_3 location in CC3, such that the control information in PDCCH_1 points to the locations of both PDCCH_2 and PDCCH_3.

Figure 5:
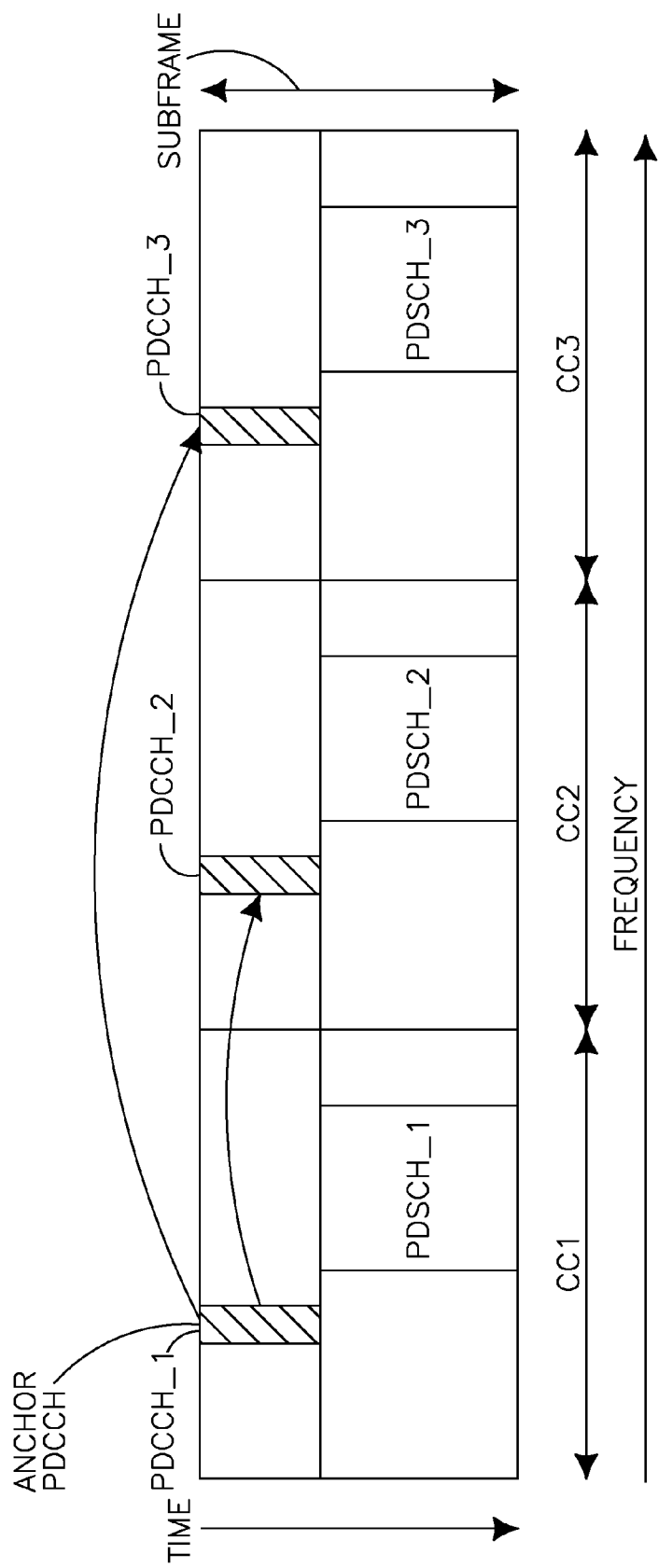
FIG. 5 shows a search space restriction indication defined for a primary component carrier using an anchor physical downlink control channel.

FIG. 5 shows an example component carrier aggregation scheme in which the three component carriers CC1, CC2 and CC3 are defined in a DL subframe, each component carrier having a separate coding of a PDCCH and a PDSCH. The eNB 120 defines an anchor PDCCH (or DCI) (i.e., a reference PDCCH (or DCI)), in this case PDCCH_1, which indicates the PDCCH locations of PDCCH_2 in CC2 and of PDCCH_3 in CC3. The eNB 120 also indicates by dynamic signaling to the WTRU 110 as to which component carrier is the primary component carrier. In this example, CC1 is defined as the primary component carrier. This restricts the user search space for the WTRU 110 during decoding, and greatly reduces the number of attempts necessary to locate the PDCCHs among the three component carriers.

The eNB 120 applies a separate coding of M sets of control information for M component carriers, using M PDCCHs. For the examples shown in FIGS. 3, 4 and 5, there are M=3 component carriers. Accordingly, the methods described below are with respect to a DL subframe with three component carriers by way of example. It should be understood that the methods described are not limited to a three-component carriers, and are applicable to variations to the number of component carriers. The WTRU 110 is configured to decode the PDCCH in order to locate the control information allocated to the WTRU 110 by the eNB 120.

Figure 6:
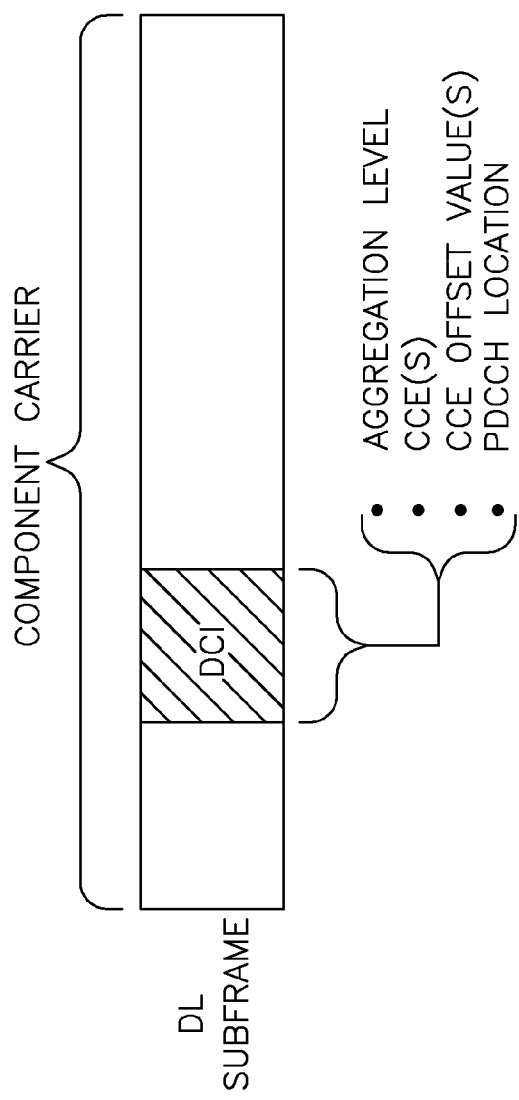
FIG. 6 shows examples of content for a physical downlink control channel employed by various methods for component carrier aggregation.

FIG. 6 shows a diagram of a DL subframe in which a PDCCH (DCI) is located within a component carrier. The eNB 120 encodes the PDCCH to include downlink control information that will indicate to the WTRU 110 such information that allows determining the remaining PDCCH locations in other component carriers, allocated to the WTRU 110, including any one of the following: one or more control channel element (CCE) locations, number of CCE candidates, one or more PDCCH locations, CCE aggregation level and one or more CCE offset values.

An offset may refer to either an offset value, or an index pointer to a particular location, CCE candidates, a CCE aggregation level, or a particular DCI format. These terms, as described herein, may be used in any combination.

Table 1 shows an example of defined aggregation levels for CCEs. For each aggregation level, a number of CCE candidates are available in the WTRU's common search space or the WTRU-specific search space. For example, if the WTRU 110 is assigned to aggregation level AL=4 by the eNB 120, the WTRU 110 would need to search four CCE candidates in the common search space and two CCE candidates in the WTRU-specific search space using blind decoding. However, by employing one of the carrier aggregation methods described herein, the eNB 120 provides pointers to which CCE candidates to decode in other component carriers, thus reducing the number of CCE candidates to be processed using blind decoding by the WTRU 110. The eNB 120 may also provide pointers to which CCE candidates to decode in the same component carriers.

TABLE 1

CCE Aggregation Levels and the Corresponding CCE Candidates

| CCE Aggregation Level (AL) | Common Search Space CCE Candidates | UE-specific CCE Candidates |
|---|---|---|
| 1 | — | 6 |
| 2 | — | 6 |
| 4 | 4 | 2 |
| 8 | 2 | 2 |
| Total | 6 | 16 |

Component Carrier PDCCH Coupling with CCE Offsets

In a first method, the eNB 120 reduces the blind decoding complexity for separate coding of the PDCCH, by coupling the PDCCHs to each other by predetermined CCE offset values. The predetermined CCE offset values may be configurable by the eNB 120.

With this method, the WTRU 110 may first attempt to decode the first PDCCH (PDCCH_1) in its WTRU-specific search space as defined in LTE R8 based on the subframe number, CCE aggregation level (e.g., AL={1, 2, 4, 8}), the assigned radio network temporary identifier (RNTI) and the number of CCE candidates. The WTRU 110 may then attempt to decode the remaining PDCCHs, PDCCH_2 and PDCCH_3, according to their respective CCE offset values.

Figure 7:
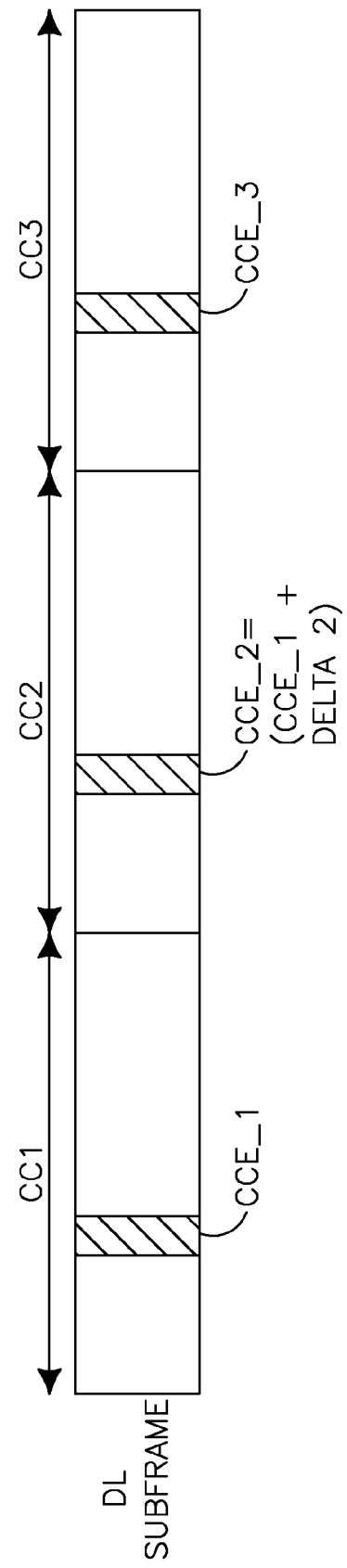
FIG. 7 shows a diagram of coupling physical downlink control channels using control channel element (CCE) offset values.

FIG. 7 shows a diagram of the DL subframe defined by the eNB 120 such that the PDCCH locations (CCE candidates) are indicated to the WTRU 110 by using CCE offset values. In a first option, the locations of PDCCH_1, 2, and 3 are coupled across multiple carriers in a parallel coupling as illustrated in FIG. 4, as follows. The location of PDCCH_2 has the CCE offset value delta2 in CC2 with respect to the CCE candidate location or starting CCE candidate location of PDCCH_1 in CC1. For example, assume that the CCE aggregation level is AL=4, and the CCE location is CCE(2) in the first component carrier CC1, and the CCE offset value is delta2=2. The WTRU 110 may then determine that the CCE candidate location in CC2 is determined by:

$$CCE \text{ candidate location} = CCE(2) + \text{delta2} \quad \text{Equation (1)}$$
$$= CCE(2) + 2$$
$$= CCE(4)$$

The location of PDCCH_3, . . . , PDCCH_M have the CCE offset values delta3, . . . , deltaM in carriers CC3, . . . , CCM with respect to the location of PDCCH_1 in CC1 respectively. A WTRU-specific search space is only defined for the first PDCCH (e.g., PDCCH_1 and consequently for CC1). The starting locations of PDCCHs in the component carriers may be reset, e.g. reset to zero, or the starting locations of PDCCHs in component carriers may be accumulated from one component carrier to another component carrier.

The starting locations of PDCCHs, as described herein, may be configured either through RRC signaling, or it may be a static configuration.

In a second option, the locations of PDCCH_1, 2, 3, . . . , M are coupled across multiple carriers in a sequential coupling as illustrated in FIG. 3, as follows. Similar to the first option, the WTRU 110 may determine the location of PDCCH_2 using the CCE offset value delta2 in CC2 with respect to the CCE location of PDCCH_1 in CC1. However, unlike the coupling described above in the first option, the WTRU may determine the location of PDCCH_3 using the CCE offset value delta3 with respect to the location of CCE_2 in PDCCH_2. Extending this sequentially for an embodiment having M component carriers, the location of PDCCH_M is defined by the CCE offset value deltaM with respect to the location of CCE(M-1) in PDCCH_M-1 in carrier $CC_{M-1}$ respectively. Thus, the location of all PDCCHs have the following relationship:

PDCCH_1←delta2→PDCCH_2←
delta3→PDCCH_3 . . . PDCCH_M-1←
deltaM→PDCCH_M

In the second option, a WTRU-specific search space is not only defined for the first PDCCH (e.g., PDCCH_1) and CC1, but also for the all PDCCHs and component carriers. If the first PDCCH (e.g., PDCCH_1) is not decoded, the WTRU 110 may continue decoding using blind decoding for the second PDCCH and so on. Because the CCE offset is relative to a previous PDCCH, the WTRU 110 may continue decoding the remaining sequentially related PDCCHs while some previous PDCCHs remain not decoded.

The WTRU 110 determines the location of the first PDCCH by monitoring the search space using blind decoding. The locations of other PDCCHs are related by CCE offset values delta2, delta3 . . . , deltaM, which are encoded as control information in the first PDCCH. Thus, the WTRU 110 may directly locate the other PDCCHs without having to perform additional blind decoding of the other component carriers. There may be a single set of CCE offset values delta2, delta3 . . . , deltaM being fixed and known to the eNB 120 and the WTRU 110. The single set of CCE offset values delta2, delta3 . . . , deltaM may be a function of cell ID or they may be cell-specific parameters. Alternatively, there may be multiple sets of CCE offset values predetermined by the network and/or configurable by the eNB 120. When multiple sets of CCE offset values are used, the WTRU may need to monitor more CCE candidates than the case when single set of CCE offset values is used.

The information about the set, or sets of CCE offset values, may be signaled to the WTRU 110 from the eNB 120 in a semi-static way (e.g., RRC signaling), such as an RRC message configuring an additional component carrier to contain an associated CCE offset values delta2, delta3 . . . , deltaM. Alternatively, the control information regarding CCE offset values may be signaled in a dynamic manner (e.g., L1/2 signaling such as carried in DCI by PDCCH or MAC control element (CE) command). Dynamic signaling of offset values may be applicable to either option, e.g., parallel or sequential coupling.

At the WTRU 110, the first PDCCH is decoded (e.g., PDCCH_1 or the PDCCH addressed to the WTRU on carrier CC1). From the control information in the decoded PDCCH, the location and CCE aggregation level of the first PDCCH, the WTRU 110 computes the locations of remaining PDCCHs using the CCE offset values delta2, delta3 . . . , deltaM. If there are N sets of CCE offset values, the WTRU 110 computes N sets of locations of the remaining PDCCHs. The WTRU 110 searches the remaining PDCCHs (e.g., PDCCH_2, PDCCH_3, . . . , PDCCH_M) using the computed PDCCH locations for the remaining PDCCHs (e.g., PDCCH_2, PDCCH_3, . . . , PDCCH_M).

If the CCE aggregation levels of remaining PDCCHs (e.g., PDCCH_2, PDCCH_3, . . . , PDCCH_M) are different from the CCE aggregation level of the first searched PDCCH (e.g., PDCCH_1), the WTRU 110 may receive the individual CCE aggregation levels of the other PDCCHs (e.g., PDCCH_2, PDCCH_3, . . . , PDCCH_M) by RRC signaling, MAC CE command, L1 signaling, or other signaling mechanism.

If the WTRU 110 does not receive signaling from the eNB 120 that contains the set of CCE offsets values, the WTRU 110 may perform blind decoding on the PDCCHs through the allowed possible CCE offsets determined by the multiple sets of CCE offsets. The WTRU 110 only knows that one of them may be the CCE offset value that eNB 120 selects for the PDCCH transmission.

If the CCE aggregation levels of the other PDCCHs (e.g., PDCCH_2, PDCCH_3, . . . , PDCCH_M) are different from the CCE aggregation level of the first searched PDCCH (e.g., PDCCH_1) and the CCE aggregation levels of the remaining PDCCHs (e.g., PDCCH_2, PDCCH_3, . . . , PDCCH_M) are not known (e.g., not signaled), the WTRU 110 may search the remaining PDCCHs (e.g., PDCCH_2, PDCCH_3, ..., PDCCH_M) using only computed locations of the remaining PDCCHs (e.g., PDCCH_2, PDCCH_3, ..., PDCCH_M) from the CCE offset values delta2, delta3 ..., deltaM.

This method also allows the network to dynamically allocate PDCCH to only a subset of the pre-configured carrier components. If M component carriers are pre-configured by the RRC layer entities, then N component carriers (where N<M) may be assigned for PDCCH monitoring purpose for a given subframe. For example, the search for remaining PDCCHs by the WTRU 110 (e.g., PDCCH_2, PDCCH_3, ..., PDCCH_M) based on computed locations could be applied only for a subset of component carriers for PDCCHs. Failure or success is based on the cyclic redundancy check (CRC) test attached to each remaining PDCCH using the assigned RNTI.

Alternatively, to speed up the blind decoding of remaining PDCCHs, the search may be stopped as soon as a CRC fails for one of the remaining PDCCHs.

An RRC entity of the eNB 120 may set an RRC entity of the WTRU 110 in order to rank the carrier components arbitrarily so that search of remaining PDCCHs would follow an order different that incremental frequency. For example, after detecting PDCCH_1, the WTRU may look for PDCCH_2 on carrier_3, then PDCCH_3 on carrier_2.

Furthermore, there may be the same CCE aggregation level or same CCE candidates for some PDCCHs (or some carriers), group of PDCCHs (or group of carriers), or all PDCCHs (or all carriers). To achieve flexibility, there may be different CCE aggregation levels for some PDCCHs (or carriers), group of PDCCHs (or group of carriers) or all PDCCHs (or all carriers).

One PDCCH may be associated with one carrier or multiple carriers (i.e., one PDCCH may carry the control information for one carrier or multiple carriers or PDSCH(s)). Also, one PDCCH may be associated with one carrier or multiple carriers or PDSCH(s). Multiple component carriers, or PDSCHs, may share the same control information in one PDCCH. The WTRU 110 may identify the component carrier, or PDSCH, using an indication or identification carried in the PDCCH indicating which PDCCH or control information controls which carrier(s) or PDSCH(s). Alternatively, such mapping or association of PDCCHs (or control information) and carriers (or PDSCHs) may be signalled, configured or predetermined by the system.

All CCE Offset Values Contained in One Reference DCI or Anchor PDCCH

As a variation of the above described method, in order to reduce the blind decoding complexity for a separate coding of PDCCHs in multiple component carriers, the eNB 120 may couple the locations of PDCCHs to each other by the predetermined CCE offset values encoded within a single component carrier's PDCCH, referred hereafter as the "reference" or "anchor" PDCCH (or DCI). As an alternative to offset values, the WTRU 110 may receive pointers or indices to PDCCH_1, PDCCH_2 ... PDCCH_M locations within their respective component carriers CC1, CC2, ..., CCM, where the pointers may be received in one single component carrier (e.g., CC1 or an arbitrarily selected component carrier). The WTRU 110 may use the carrier identification to identify the association of PDCCHs with carriers.

The anchor PDCCH (e.g., PDCCH_1) may be assigned arbitrarily. The remaining PDCCHs are assigned according to their CCE offset values. The locations of PDCCH_1, 2, 3, ..., M are coupled within the same carrier as follows. The location of PDCCH_2 has the CCE offset value delta2 with respect to the location or starting location of PDCCH_1 in the same carrier. Each successful detection of a PDCCH reduces the search space for next PDCCH, and so on. The location of PDCCH_3 ... PDCCH_M have the CCE offset values delta3 ... deltaM with respect to the location or starting location of PDCCH_1 respectively in the same carrier.

In this method variation, the WTRU-specific search space is defined only for the reference or anchor PDCCH (e.g., PDCCH_1). The locations of PDCCH_1, 2, 3, ..., M are coupled within the same carrier as follows. The location of PDCCH_2 has the CCE offset value delta2 with respect to the CCE location or starting CCE location of PDCCH_1 in the same carrier. The location of PDCCH_3, ..., PDCCH_M have the CCE offset values delta3 ..., deltaM with respect to the location of PDCCH_2, PDCCH_3, ..., PDCCH_M−1 in the same carrier respectively. The following relationship applies:

$$PDCCH\_1 \xleftarrow{delta2} PDCCH\_2 \xleftarrow{delta3} PDCCH\_3 \ldots PDCCH\_M-1 \xleftarrow{deltaM} PDCCH\_M.$$

The location of the first PDCCH may be determined by the search using blind decoding. The locations of other PDCCHs are related by CCE offset values delta2, delta3 ..., deltaM.

To further reduce the blind decoding complexity, the WTRU 110 may first decode the PDCCH with the highest CCE aggregation level, since less blind decoding attempts are required when searching the PDCCH with highest CCE aggregation level, as there are less available CCE candidates at higher aggregation levels. See Table 1. The WTRU 110 may be configured to always begin decoding attempts with the highest aggregation level, or the WTRU 110 may be instructed by a communication from eNB 120 to do so, such as by always transmitting the reference DCI or anchor PDCCH using the highest CCE aggregation level for robustness of reception for reference DCI or anchor PDCCH.

Power Efficiency

The WTRU 110 may perform a power efficient variation of the above method by using all PDCCHs associated with component carriers different than the anchor carrier containing the PDCCH locations (e.g., CC2, CC3, ..., CCM), defined by the network via the eNB 120 for a downlink assignment, not for the current subframe but for a future subframe. For example, the WTRU 110 may receive PDCCH_2, PDCCH_3, ..., PDCCH_M in subframe_x, such that the downlink assignment associated with these PDCCHs may apply to a PDSCH and/or PUSCH in subframe_x+k for PDSCH reception or PUSCH transmission at the WTRU 110. The value k may be selected large enough to allow activation of receiver circuitry associated with these additional carriers and associated tasks to correctly receive the information carriers over the PDSCH of these carriers. The value k may be an agreed upon value or configurable based on the WTRU capability, or a network configuration. For example, the control channels PDCCH_2, PDCCH_3 ... PDCCH_M uplink access grants may apply to subframe_x+4.

With this method, on a condition that the WTRU 110 successfully decodes a PDCCH with a downlink assignment for a DL-SCH transmission in subframe_x in a component carrier other than the anchor carrier, the WTRU 110 may then decode the PDSCH using the information in the assignment in the subframe_x+k.

All Control Information Carried in Each PDCCH

In this variation of the above signaling methods applied to separately coded component carriers, the control information for all PDCCHs (or DCIs), such as the locations of other PDCCHs (or DCIs), the CCE candidate offset values, and/or the CCE aggregation levels, are carried in each of the PDCCHs. The control channels PDCCH_1, PDCCH_2 ...

PDCCH_M may be transmitted either in one single carrier, a subset of carriers, or in all carriers. The carrier identification may be used to identify the association of PDCCHs with carriers if all PDCCHs are transmitted in one carrier, a subset of carriers, or all carriers if the received PDCCH is not intended for the PDSCH in the same DL carrier or for the PUSCH in the associated UL carrier with DL carrier.

The PDCCHs may be assigned arbitrarily to the component carriers in terms of their CCE candidate locations or addresses, but follow the rule of CCE aggregation as described in the above method. One or more of the following control information may be included in each PDCCH: the locations of other PDCCH candidates, the CCE offsets of other PDCCH candidates, and the CCE aggregation levels of other PDCCH candidates.

The eNB 120 may encode each PDCCH with a CCE offset of at least one other PDCCH and/or CCE aggregation levels of at least one other PDCCH (if CCE aggregation levels of PDCCHs are different from each other).

The WTRU 110 may decode the PDCCH search space and detect the first PDCCH (e.g., PDCCH_1). The CCE aggregation level of the first PDCCH is then obtained. If presently defined within the PDCCH, the WTRU 110 obtains CCE offset values of the other PDCCHs to be searched. The WTRU 110 searches for the other PDCCHs (e.g., PDCCH_2, PDCCH_3, . . . , PDCCH_M) using the obtained CCE aggregation level of the first PDCCH (e.g., PDCCH_1) and CCE offset values of other PDCCHs from the first PDCCH (e.g., PDCCH_1). If the CCE aggregation levels of the PDCCHs are the same, the obtained CCE aggregation level of the first PDCCH is applied when the search is performed. This first decoded PDCCH may then be used as a reference (i.e., a reference PDCCH) to decode other PDCCHs. If the CCE aggregation levels of the PDCCHs are different and not known, the WTRU 110 may blind decode the other PDCCHs using all CCE aggregation levels when the search is performed. If the CCE aggregation levels of the PDCCHs are different and known (e.g., signaled), the WTRU 110 may blind decode the other PDCCHs using the known CCE aggregation levels when search the search is performed.

The WTRU 110 may perform the search by using location information or CCE offset information if the CCE aggregation level is not known. The search should be performed using the CCE aggregation level if location information or CCE offset information is not known. The search may be performed using one or more of location information, CCE offset information and CCE aggregation level, if all of them are known.

This method reduces the blind decoding complexity because different CCE aggregation levels and locations need to be searched only for the first or previous PDCCH. The complexity of blind decoding for searching the first PDCCH cannot be avoided. However, when searching the remaining PDCCHs, only different CCE aggregation levels or different locations or none of them need to be searched, which significantly reduces the blind decoding complexity.

Partial Control Information Carried in Each PDCCH

In a variation to the previous method above, the eNB 120 may define sequential couplings between PDCCHs (e.g., PDCCH_1 may be coupled to PDCCH_2, which may be coupled to PDCCH_3 and so on), where only partial control info is carried in each PDCCH, so that only partial control info is defined in a carrier to allow for more PDCCH scheduling flexibility. For example, PDCCH_1 may contain partial control information, such as location information of PDCCH_2. In turn, PDCCH_2 may contain partial control information, such as the location information of PDCCH_3, and so on. The WTRU 110 may then decode the first PDCCH (e.g., PDCCH_1), obtain the location of second PDCCH (e.g., PDCCH_2) which is coupled to the first PDCCH (e.g., PDCCH_1). From decoding the second PDCCH, the WTRU 110 may obtain the location of the third PDCCH (e.g., PDCCH_3. The WTRU 110 may then proceed to decode any remaining PDCCHs in a similar fashion based on their order and relationship of linking.

Alternatively, one PDCCH may be coupled to two or multiple PDCCHs, e.g., PDCCH_1 may point to PDCCH_2 and PDCCH_3, either or both of which may point to PDCCH_4 and PDCCH_5, and so on. Alternatively, PDCCH_2 may be coupled to PDCCH_4, and PDCCH_3 may be coupled to PDCCH_5. For example, PDCCH_1 may contain partial control information, such as location information of both PDCCH_2 and PDCCH_3, which may contain partial control information, such as location information of PDCCH_4 and/or PDCCH_5, and so on.

By way of another example, the eNB 120 may define a common CCE aggregation level for all PDCCHs. As an example, if the eNB 120 defines locations of the PDCCHs as arbitrary to each other in terms of their CCE addresses, the WTRU 110 may decode the first PDCCH (e.g., PDCCH_1), obtain the CCE aggregation level of the first decoded PDCCH, and search the remaining PDCCHs (e.g., PDCCH_2, PDCCH_3 . . . PDCCH_M) using the obtained CCE aggregation level from the first decoded PDCCH (used as a reference PDCCH for other PDCCHs), which is the same CCE aggregation level for all CCEs.

By way of another example, the eNB 120 may define a common CCE candidate for all PDCCHs, whereby the WTRU 110 may decode the first PDCCH (e.g., PDCCH_1), obtain the CCE candidate where the first PDCCH is decoded, and search the remaining PDCCHs (e.g., PDCCH_2, PDCCH_3 . . . PDCCH_M) at the same CCE candidate location where the first PDCCH is decoded. The first decoded PDCCH is used as a reference PDCCH for other PDCCHs.

Coupling By Starting CCE Position

To reduce the blind decoding complexity for separate coding of PDCCH, the eNB 120 may couple the PDCCHs by defining the starting position of the second through last PDCCHs (e.g., PDCCH_2, PDCCH_3, . . . , PDCCH_M) relative to the starting CCE position of the respective WTRU-specific search defined for their respective carriers, by using the CCE position of the first PDCCH (e.g., PDCCH_1) relative to the starting CCE position of the WTRU-specific search space. With WTRU-specific search spaces defined for each carrier, no CCE offsets need to be signaled by the network via the eNB 120, and blind decoding is only required for PDCCH_1. A starting CCE candidate is used such that a range of search (from "starting" CCE to the "last" CCE) is performed for next PDCCH instead of using an offset to exactly point to the CCE candidate for the next PDCCH.

For example, the WTRU 110 may detect PDCCH_1 on starting $CCE\_(x+4)$ for an aggregation level of L=4, with a WTRU-specific search space for aggregation level AL=4 having a range of $CCE\_[x; x+16]$. The WTRU 110 may then detect PDCCH_2 contained in CC2 with a WTRU-specific search space ranging from $CCE\_[y; y+16]$, starting the search at $CCE\_(y+4)$, thus reducing the number of blind decodings required for the remaining PDCCHs (e.g., PDCCH_2, PDCCH_3, . . . , PDCCH_M). For a starting CCE of $CCE\_(y+4)$, the previous CCEs (i.e., $CCE\_y$, $CCE\_(y+1)$, $CCE\_(y+2)$, $CCE\_(y+3)$) have been eliminated from the blind decoding search.

Furthermore, this method may also allow the WTRU 110 to search aggregation levels other than the one detected for PDCCH_1. Using the same example, if a WTRU-specific search space for PDCCH_3 and carrier CC3 has a range of CCE_[z;z+8] for aggregation level L=2, then the starting CCE position of PDCCH_3 would be CCE_(z+4). This method of using the relative offset from the starting CCE of the WTRU-specific search space may be used by the WTRU 110 to implicitly disregard particular aggregation levels, as there are particular aggregation levels cannot start at particular offsets from the start of the search space. In the above example, aggregation levels AL>=8 are not supported for relative offset of four from the starting CCE of the search space.

Search Space Restriction—Excluding Aggregation Levels

In this component carrier aggregation method, the eNB 120 signals the CCE aggregation levels of PDCCHs to the WTRU 110. The allowed CCE aggregation levels for each PDCCH represent a reduced subset of all possible CCE aggregation levels. The eNB 120 may assign PDCCHs arbitrarily in the WTRU-specific search space and common search space as defined based on, for example, the subframe number, aggregation level (e.g., AL={1, 2, 4, 8}), the assigned RNTI and the number of CCEs in terms of the starting CCE addresses. The WTRU 110 may exclude some aggregation levels from the blind decoding procedure based on signaling from the network via the eNB 120. In this method, a WTRU-specific search space and/or common search space is defined for each component carrier, which may be pre-configured by the network. Information about the CCE aggregation levels of the PDCCHs may be obtained by the WTRU 110 from the eNB 120 either in semi-static manner (e.g., RRC signaling) or dynamic manner (e.g., L1/2 signaling).

If the CCE aggregation level does not change fast and remains the same for a certain duration, then the information for the duration of CCE aggregation level that stays the same may also be signaled or predetermined.

The WTRU 110 obtains the CCE aggregation levels of all PDCCHs via network signaling from the eNB 120. For each pre-configured component carrier, the WTRU 110 blindly decodes the PDCCH candidates in WTRU-specific search space for the allowed aggregation level. The WTRU 110 may not detect candidate PDCCHs at excluded aggregation levels. In the case that the CCE aggregation level is signaled via L1/2 signaling, the WTRU 110 may decode the PDCCHs with allowed CCE aggregation levels received from the eNB 120. There may be only one allowed CCE aggregation level for each PDCCH, or there may be multiple allowed CCE aggregation levels for each PDCCH.

Figure 8:
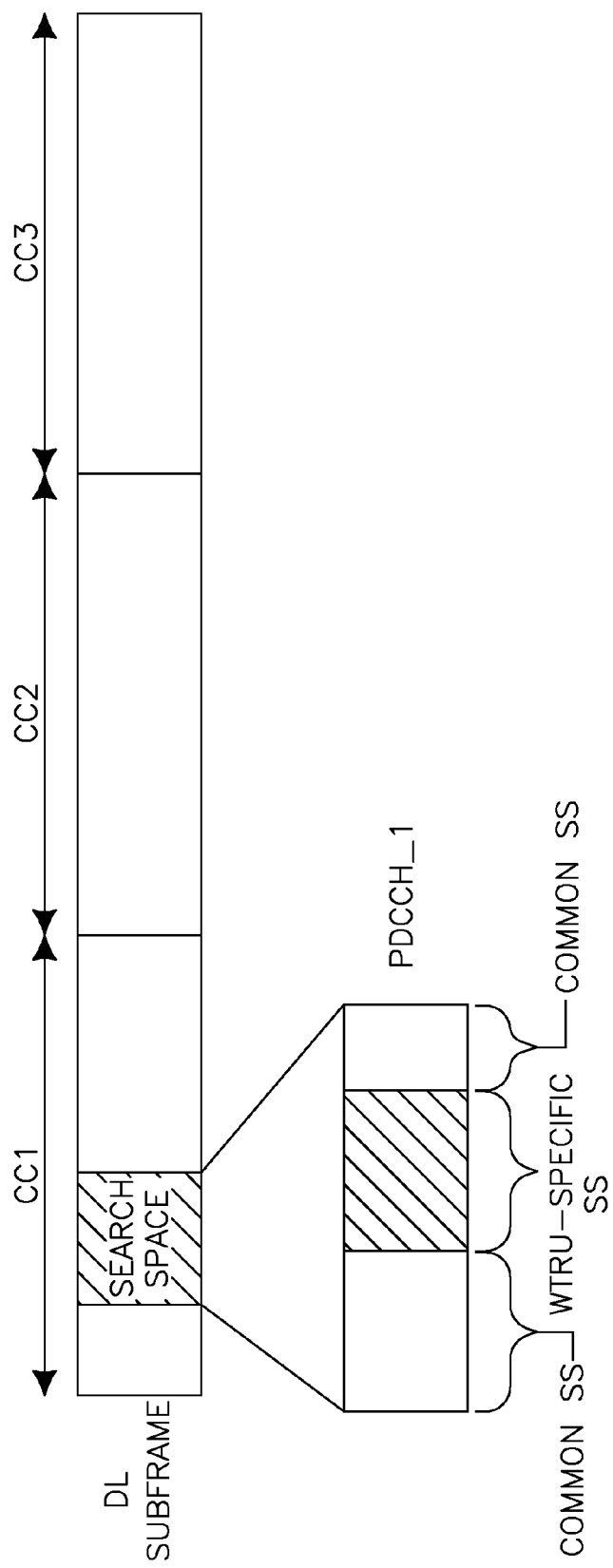
FIG. 8 shows a diagram of search space in an aggregated component carrier that may be restricted according to CCE aggregation level and/or a specific CCE position.

FIG. 8 shows an example diagram of a DL subframe having three component carriers CC1, CC2, and CC3. The search space in each component carrier consists of common search space (SS) and WTRU-specific SS, which may be restricted to reduce blind decoding by the WTRU 110. In this example, the eNB 120 defines a CCE aggregation level restriction which is received by the WTRU 110, such that the search space is reduced by exclusion of aggregation levels AL=1, 2 and 8. This limits the search to only CCEs associated with aggregation level AL=4. Within the search space of aggregation level AL=4, the WTRU 110 searches for and locates the PDCCH_1 within four common search space CCE candidates and two WTRU-specific CCE candidates, in accordance with the example aggregation level definitions shown in Table 1. This restriction reduces the blind decoding of all CCE candidates for all aggregation levels.

Search Space Restriction—Excluding Specific CCE Candidates

In this component carrier aggregation method, the eNB 120 signals the CCE candidate index of PDCCHs to the WTRU 110. The allowed CCE candidates for each PDCCH represent a reduced subset of all possible CCE candidates. Some specific CCE candidates may be excluded from the blind decoding based on signaling from the network via the eNB 120. In this method, a WTRU-specific search space and/or common search space are defined for each carrier component, which has been pre-configured by the network. The information about the CCE candidates of the PDCCHs may be signaled to WTRU 110 from eNB 120 either in semi-static manner (e.g., RRC signaling) or dynamic manner (e.g., L1/2 signaling).

If CCE candidate(s) remain the same for certain duration, then the information for the duration of CCE candidate(s) that stays the same may also be signaled or predetermined.

At the WTRU 110, the CCE candidates of all PDCCHs are obtained via network DL signaling by the eNB 120. For each pre-configured component carrier, the WTRU 110 blindly decodes the PDCCH candidates in WTRU-specific search space for the allowed CCE candidates. The WTRU 110 may not detect candidate PDCCHs at excluded CCE candidates. There may be only one allowed CCE candidate for each PDCCH, or there may be multiple allowed CCE candidates for each PDCCH.

Referring again to FIG. 8, in this example, the WTRU 110 may receive the CCE candidate restriction, such that the search space is reduced to search only the second CCE candidate of any CCE aggregation level. According to the example aggregation level definitions shown in Table 1, for common search space, only aggregation levels AL=4 and AL=8 have CCE candidates. Within the search space of the second CCE candidate, the WTRU 110 is limited by searching two CCE candidates for the PDCCH_1 in the common search space (i.e., the second CCE candidate with aggregation levels AL=4, 8). For the WTRU-specific search space, the WTRU 110 is limited to search only four CCE candidates of CCE aggregation levels AL=1, 2, 4, and 8 (i.e., the second CCE candidate with aggregation levels AL=1, 2, 4, 8).

Search Space Restriction—Excluding Combinations of CCE Aggregation Levels and CCE Candidates In this component carrier aggregation method, the eNB 120 signals the CCE candidate and aggregation level combination index of PDCCHs to the WTRU 110. The allowed CCE candidate and aggregation level combinations for each PDCCH represent a reduced subset of all possible CCE candidate and aggregation level combinations. Some CCE candidate and aggregation level combinations may be excluded from the blind decoding based on signaling from the network via the eNB 120. In this method, a WTRU-specific search space and/or common search space are defined for each carrier component, which has been pre-configured by the network. The information about the CCE candidate and aggregation level combinations of the PDCCHs may be signaled to WTRU 110 from eNB 120 either in semi-static manner (e.g., RRC signaling) or dynamic manner (e.g., L1/2 signaling).

If CCE candidate and aggregation level combinations remain the same for certain duration, then the information for the duration of CCE candidate and aggregation levels that stay the same may also be signaled or predetermined.

At the WTRU 110, the CCE candidate and aggregation level combinations of all PDCCHs are obtained via network signaling by the eNB 120. For each pre-configured component carrier, the WTRU 110 blindly decodes the PDCCH candidates in WTRU-specific search space for the allowed CCE candidate and aggregation level combinations. The WTRU 110 may not detect candidate PDCCHs at excluded CCE candidate and aggregation level combinations. There may be only one allowed CCE candidate and aggregation level combination for each PDCCH, or there may be multiple allowed CCE candidate and aggregation level combinations for each PDCCH.

Referring again to Table 1 and FIG. 8, for this example, the WTRU 110 receives the CCE candidate and aggregation level combination restriction, such that the search space is reduced to search only the second CCE candidate for CCE aggregation level AL=4. Within the search space of the second CCE candidate and aggregation level AL=4, the WTRU 110 searches for and locates the PDCCH_1 at only one CCE candidate in the common search space (i.e., the second CCE candidate with aggregation level AL=4) and one CCE candidate in WTRU-specific search space (i.e., the second CCE candidate with aggregation level AL=4).

Search Space Restriction—Excluding Search Space in Component Carriers

In this component carrier aggregation method, the eNB 120 signals the search space of PDCCHs to the WTRU 110. Some component carriers may be excluded from the blind decoding based on signaling from the network via the eNB 120. In this method, common search space in some component carriers may be excluded from the blind decoding performed by the WTRU 110. For example, all component carriers except a primary one are excluded from blind decoding, and the WTRU 110 is not required to monitor the PDCCH in common search space of those component carriers that are excluded from blind decoding for common search space. Similarly, WTRU-specific search space in some component carriers may be excluded from the blind decoding performed by the WTRU 110. For example, some component carriers are excluded from blind decoding and WTRU 110 is not required to monitor the PDCCH in WTRU-specific search space of those component carriers that are excluded from blind decoding for WTRU-specific search space. The information about whether to search PDCCH in common or WTRU-specific search space in one, some or all component carriers may be signaled to WTRU 110 from eNB 120 either in semi-static manner (e.g., RRC signaling) or dynamic manner (e.g., L1/2 signaling).

Search Space Restriction—Anchor Component Carrier

In this separately coded PDCCH component carrier aggregation method, the eNB 120 restricts the search space for the WTRU 110 by defining a an anchor PDCCH (i.e., a reference PDCCH) transmitted in a primary carrier (or anchor carrier) or a secondary (or non-anchor) carrier. The WTRU 110 first decodes the component carrier with the anchor PDCCH, which carries the control information about other PDCCHs. The control information may include any one or more of the following. If CCE aggregation levels of the remaining PDCCHs are the same, the control information may include a single CCE aggregation level of the remaining PDCCHs. For different CCE aggregation levels, the control information may include individual CCE aggregation levels of remaining PDCCHs. If the remaining PDCCHs are coupled to each other, the control information may include a single exact location. Otherwise, the control information may include an individual location of each PDCCH. The remaining PDCCHs (e.g., PDCCH_2, PDCCH_3 . . . PDCCH_M) are decoded after the anchor PDCCH (e.g., PDCCH_1) is decoded.

The WTRU 110 may decode the anchor PDCCH first in the anchor carrier. After control information in anchor PDCCH is decoded, the WTRU 110 decodes a non-anchor PDCCH in either an anchor or non-anchor carriers. Alternatively, the WTRU 110 may detect the first PDCCH (e.g., PDCCH_1) and determine other PDCCH's aggregation level based on channel quality indicator (CQI) reports that it sent to eNB.

Anchor Carrier With Best Channel Quality

To increase the reliability the WTRU 110 detecting an anchor PDCCH, the eNB 120 may define the anchor carrier, which has the anchor PDCCH, to be a carrier in which channel quality is best among the aggregated carriers. The carrier carrying the anchor PDCCH may be an anchor carrier. Alternatively, the anchor carrier may be selected based on channel quality indicator (CQI) reporting (or path loss estimates) for all the aggregated carriers. In the case of utilizing CQI reporting, as the WTRU 110 is assumed to send CQI for each carrier to the eNB 120, either on a regular basis or a trigger basis, the eNB 120 determines a carrier to carry the anchor PDCCH upon receiving the CQI report, where the carrier has highest CQI. In this case, since the WTRU 110 has the CQI information, the WTRU 110 may begin decoding the anchor PDCCH in the carrier with highest CQI. For decoding other PDCCH(s), if any, one of the methods described herein may be used by the WTRU 110.

By depending on the CQI reporting in selecting an anchor PDCCH carrying carrier, the WTRU-specific search space may be time varying, which resolves scheduling blocks between WTRUs, as channel conditions for the individual carrier vary with time (and WTRU).

By way of example, the WTRU 110 may receive the PDCCH with DCI format 3/3A (i.e., carrying transmit power control (TPC) commands), which is transmitted by the eNB 120 only in a particular carrier, such as one having the highest CQI (or lowest CQI) where the TPC command(s) using DCI format 3/3A may be used to control UL transmit power setting for all the UL carriers so that only a single PDCCH is enough for each active WTRU 110. At handover, when the WTRU 110 camps on another cell, the new cell may still use the same PDCCH signaling configuration (including anchor PDCCH) which was used by the old cell, right after the handover. This may reduce the WTRU complexity in searching for and decoding the PDCCH.

Anchor Carrier—Power Efficiency

In this method for component carrier aggregation, the WTRU 110 may only monitor the WTRU-specific search space of a an anchor carrier (e.g., CC1) defined by the eNB 120, by default or initially, unless the WTRU 110 gets an explicit order or implicit trigger to monitor the other WTRU-specific search space according to any one of the following options.

In a first option, an explicit order may be located in PDCCH_1 in the carrier CC1. The order may be represented in a new single bit field (e.g., component activation) in any DCI that command the WTRU 110 to start monitoring or searching remaining PDCCH (e.g., PDCCH_2, PDCCH_3, . . . , PDCCH_M) in k subframes.

In a second option, an explicit order may be located as in the first option, but having a series of bits with a length equal to the number of additional carrier components supported by the network or by the WTRU 110. The value, or each bit, may allow activating the monitoring of each individual carrier component independently.

In a third option, an implicit order may be based on some traffic triggers, such as the size of the transport block defined in PDCCH_1 larger than a signalled threshold, or the cumulative bits received in the last L subframes is larger than a signalled threshold. The implicit order instructs the WTRU to start monitoring or search the remaining PDCCHs in k subframes.

In a fourth option, a new MAC control element (CE) command may also carry a component activation field, as described for the first and second options, to start monitoring of the remaining PDCCHs in k subframes.

In a fifth option, an implicit order as described in the third option may also be based on DRX related timers or DRX state. For example, the initial subframe of the On-duration timer may always be a single carrier PDCCH monitoring. Then based on some activity threshold or related specifically to DRX timers, the implicit order triggers full carrier component monitoring.

Note that a component carrier activation field could also be used to deactivate component monitoring based on simple Boolean logic as described in the first and second options. Implicit deactivation could also be done through inactivity timers or cumulative bits received lower than a certain threshold in the last L subframes. Deactivation could take effect immediately or after M subframes.

Joint PDCCH Coding

In the context of joint coding of PDCCH, a single WTRU-specific search space may be defined by the eNB 120 for one carrier, such that the WTRU 110 may have a reduced complexity in blind decoding, and thus an increase of the number of different DCI formats would be less problematic.

In a first option, a single size format is defined for a certain number of carriers M1, e.g., M1=3 carriers. For assigning more than M1 carriers, the remaining assigned carriers (e.g., carriers CC4 and CC5) use the same control information of one of the M1 carriers, say carrier 3. For example, in a joint coded PDCCH, a Control Information_1 may be used for carrier CC1, a Control Information_2 may be used for carrier CC2, and a Control Information_3 may be used for carriers CC3, CC4 and CC5. The number of carriers, M1, is a design parameter.

In a second option, multiple size formats are defined by the eNB 120, but the number of formats is less than the maximum number of configured carriers. For example, Format-1 may have one carrier, Format-2 may have three carriers, and Format-3 may have five carriers.

In a third option, the eNB 120 first signals control information about the number of carriers that are assigned, then uses a predefined DCI format that corresponds with the format size. By doing so, the WTRU 110 does not need to perform blind decoding for decoding different formats. Once a number of carriers is indicated, the DCI format is decided automatically.

Joint Coding Power Efficiency

Since all PDCCHs are located on the same carrier for joint coding, the eNB 120 may perform a power efficient variation of this method by using the control information associated with carriers different than the anchor carrier containing the PDCCH (e.g. carrier_2, carrier_, . . . , carrier_M) to correspond to a downlink assignment for a future subframe. For example, the eNB 120 may send Control Information_2, Control Information_3, . . . , Control Information_M to the WTRU 110 in a subframe_x, such that the downlink assignment associated with the control information may apply to subframe_x+k. The size for k subframes may be large enough to allow activation of receiver circuitry associated with these additional carriers and associated tasks to correctly receive the information carriers over the PDSCH of these carriers. The value k may be an agreed upon value or something configurable based on the capability of the WTRU 110, or a network configuration.

For uplink grants, the Control Information_2, Control Information_3, . . . , Control Information_M may apply to subframe_x+4.

Joint Coding—Dynamic Search Space Re-definition

In the context of joint coding of PDCCH where a single WTRU-specific search space may be defined for one carrier, multi-carrier assignment typically requires sending more information, which could result in having an imbalance between the capability of the network to send assignment over a given carrier (joint PDCCH) and the multi-carrier resource available in terms of PDSCH. Also, the channel quality of a particular carrier used for a certain number of WTRU to send assignment may deteriorate, and the coding rate used to send the PDCCH would drop, which could contribute to reducing the capability to send assignments for a given carrier.

In this method, the eNB 120 may change the WTRU-specific search space semi-statically or dynamically. For semi-static redefinition with RRC signaling, the RRC entity of the eNB 120 may signal the new search space (e.g, a simple RRC message re-defining the new component carrier to which the WTRU-specific search zone should be located). The information element (IE) redefining the carrier of the WTRU-specific search space may be part of the RRC_ConnectionReconfiguration procedure used to setup the data bearer. The absence of the IE may simply mean that the default configuration should be used. In other words, the default configuration is for the WTRU-specific search space to reside in the anchor carrier. The anchor carrier is defined as the carrier to which the common search space resides and also the carrier used to send paging, from which the WTRU 110 should acquire the system information in idle mode and connected mode.

For dynamic search space re-definition the WTRU 110 may receive a MAC CE message indicating that the WTRU-specific search space has changed and that the WTRU should now monitor WTRU-specific search space on another component carrier. The WTRU 110 may derive the CCEs associated with the search space on the new component carrier based on existing default procedures.

Hybrid Coding

Using a hybrid coding approach for PDCCH detection which incorporates both separate coding and joint coding of PDCCHs, an anchor PDCCH is defined by the eNB 120. For M carriers and M PDCCHs, the anchor PDCCH (e.g., the first PDCCH) is separately encoded from other PDCCHs. The remaining PDCCHs (non-anchor PDCCHs) are jointly encoded.

The anchor PDCCH may carry the control information (e.g., resource bloc (RB) allocation, and the like) for the anchor carrier or the PDSCH. The anchor PDCCH may also carry the control information about other carriers that are aggregated, such as only including the number of carriers that are aggregated and/or the exact carrier IDs that are aggregated. The anchor PDCCH may also carry the exact location of joint PDCCHs (non-anchor PDCCHs) in carrier aggregation, and the CCE aggregation level(s) of joint PDCCHs (non-anchor PDCCHs) in carrier aggregation.

By way of example, the WTRU 110 may decode the anchor PDCCH first in the anchor carrier, and decode non-anchor PDCCHs in either the anchor carrier or the non-anchor carriers after control information in the anchor PDCCH is decoded.

Based on what control information may be carried in the anchor PDCCH, such as the number of carriers aggregated (which determine the DCI format for joint PDCCH), the carrier ID, or the exact location of joint PDCCHs, the following options may be possible.

The WTRU 110 may decode the anchor PDCCH in the anchor carrier where the anchor PDCCH carries information about at least one of the following: the number of assigned carriers, the carrier ID, the search space of the joint PDCCHs, and the exact location of the joint PDCCHs. Based on this information in the anchor PDCCH, the WTRU 110 may decode the corresponding DCI format for the joint PDCCHs.

Alternatively, the eNB 120 sends RRC signaling to inform the WTRU 110 about the number of assigned carriers, the carrier ID, the search space and/or the exact location of the anchor PDCCH, allowing the WTRU 110 to decode the corresponding DCI format.

Backward Compatibility with Search Space

Separate WTRU-specific search space may be defined for an LTE-A PDCCH as well as an earlier evolution (e.g., LTE R8) PDCCH to allow for a backward compatible implementation. WTRU-specific search space may be defined by the eNB 120, such that a WTRU-specific LTE R8 search space may not overlap or completely overlaps with WTRU-specific LTE-A search space. This would avoid confusion between multimode operation (e.g., LTE R8 and LTE-A) in a single WTRU 110, and assist the WTRU 110 in the DCI format blind decoding, since a WTRU blindly detecting a PDCCH in a WTRU-specific LTE-A search space cannot find a DCI format associated with LTE R8 PDCCH. This would also allow a WTRU to differentiate a DCI format LTE R8 from a DCI format LTE-A of same size in the context of the search space used. Consequently, the LTE-A DCI format could reuse the same size length of LTE R8 DCI format.

For example, the WTRU 110 may search an LTE R8 PDCCH search space that partially overlaps with an LTE-A search space. The overlapped CCEs of the two search spaces must not constitute a candidate PDCCH based on the aggregation level applicable for this search. For example, for a search space of aggregation level AL=4, a given LTE-A search space with CCE number {8, 9, 10, 11, 12, 13, 14, 15} may overlap with LTE R8 search space with CCE number {13, 14, 15, 16, 17, 18, 19, 20}, since no candidate with aggregation level AL=4 could be found with the overlap region (i.e., the partial overlapping of search space does not include common control channel element (CCE) candidates).

The above described methods apply for CCE aggregation levels of PDCCHs (or carriers) that are the same or different, and are applicable to both WTRU-specific search space and to common search space.

Although features and elements are described above in particular combinations, each feature or element may be used alone without the other features and elements or in various combinations with or without other features and elements. The methods and procedures provided herein may be implemented either alone or in combination, in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method of component carrier aggregation implemented by a wireless transmit/receive unit, the method comprising:
   receiving a message activating a second component carrier via a first component carrier;
   attempting to decode a first physical downlink control channel (PDCCH) transmission on the first component carrier, the first PDCCH transmission including first control information comprising scheduling information for a physical downlink shared channel (PDSCH) associated with the first component carrier;
   attempting to decode a second PDCCH transmission on the first component carrier, the second PDCCH transmission including second control information comprising scheduling information for a PDSCH associated with the second component carrier, wherein the WTRU determines a location to attempt to decode the second PDCCH transmission based on a control channel element (CCE) offset value; and
   receiving data over the first component carrier and the second component carrier.

2. The method as in claim 1, wherein the CCE offset value is indicative of the location to attempt to decode the second PDCCH transmission relative to a starting CCE candidate location associated with the attempt to decode the first PDCCH transmission.

3. The method as in claim 1, wherein the second PDCCH transmission comprises a carrier identification field that indicates that the second PDCCH transmission is associated with the second component carrier.

4. The method as in claim 1, wherein the WTRU determines the location to attempt to decode the second PDCCH transmission relative to a starting CCE position of a WTRU-specific search space.

5. The method as in claim 1, further comprising receiving a radio resource control (RRC) message from an evolved Node B (eNB), the RRC message indicating one or more WTRU-specific search spaces to be monitored on the plurality of component carriers.

6. The method as in claim 1, further comprising receiving information regarding the CCE offset value via radio resource control (RRC) signaling.

7. The method as in claim 1, wherein the message activating the second component carrier is a medium access control (MAC) control element.

8. The method as in claim 1, wherein receiving the data over the first component carrier and the second component carrier comprises:

receiving first data over the PDSCH associated with the first component carrier; and receiving second data over the PDSCH associated with the second component carrier.

9. The method as in claim 8, wherein the scheduling information for the PDSCH associated with the first component carrier is scheduling information for the first data and the scheduling information for the PDSCH associated with the second component carrier is scheduling information for the second data.

10. A method of component carrier aggregation implemented by a wireless transmit/receive unit (WTRU), comprising:

receiving a downlink subframe having a plurality of component carriers, each component carrier having control information encoded in a physical downlink control channel (PDCCH);

receiving a search space restriction for detection of a PDCCH, wherein the search space pertains to at least one of a common search space or a WTRU-specific search space, and the search space restriction is based on a control channel element (CCE) aggregation level restriction and a specific CCE candidate restriction; and performing a decoding of control information of a first PDCCH in a first component carrier within the restricted search space.

11. The method as in claim 10, wherein the search space restriction is received by the WTRU with dynamic signaling.

12. The method as in claim 10, wherein the search space restriction is received by the WTRU with semi-static signaling.

13. The method as in claim 10, wherein the search space restriction relates to search spaces defined for at least two different OFDMA-based radio access systems, where any partial overlap of the search spaces of different OFDMA-based radio access systems does not include common control channel element (CCE) candidates.

14. A wireless transmit/receive unit comprising:

a receiver configured to receive a message activating a second component carrier via a first component carrier;

a processor configured to attempt to decode a first physical downlink control channel (PDCCH) transmission on the first component carrier, the first PDCCH transmission including control information comprising scheduling information for a physical downlink shared channel (PDSCH) associated with the first component carrier, and attempt to decode a second PDCCH transmission on the first component carrier, the second PDCCH transmission including second control information comprising scheduling information for a PDSCH associated with the second component carrier, wherein the processor is configured to determine a location to attempt to decode the second PDCCH transmission based on a control channel element (CCE) offset value; and the receiver further configured to receive data over the first component carrier and the second component carrier.

15. The WTRU as in claim 14, wherein the CCE offset value is indicative of the location to attempt to decode the second PDCCH transmission relative to a starting CCE candidate location associated with the attempt to decode the first PDCCH transmission.

16. The WTRU as in claim 14, wherein the second PDCCH transmission comprises a carrier identification field that indicates that the second PDCCH transmission is associated with the second component carrier.

17. The WTRU as in claim 14, wherein the WTRU determines the location to attempt to decode the second PDCCH transmission relative to a starting CCE position of a WTRU-specific search space.

18. The WTRU as in claim 14, wherein the receiver is further configured to receive a radio resource control (RRC) message from an evolved Node B (eNB), the RRC message indicating one or more WTRU-specific search spaces to be monitored on the plurality of component carriers.

19. The WTRU as in claim 14, wherein the processor is configured to determine a location to attempt to decode the first PDCCH transmission based on an aggregation level.

20. The WTRU as in claim 14, further comprising an antenna and a battery.

21. The WTRU as in claim 14, wherein the receiver is further configured to receive information regarding the CCE offset value via radio resource control (RRC) signaling.

22. The WTRU as in claim 14, wherein the message activating the second component carrier is a medium access control (MAC) control element.

23. The WTRU as in claim 14, wherein the receiver is configured to receive the data over the first component carrier and the second component carrier by:

receiving first data over the PDSCH associated with the first component carrier; and receiving second data over the PDSCH associated with the second component carrier.

24. The WTRU as in claim 23, wherein the scheduling information for the PDSCH associated with the first component carrier is scheduling information for the first data and the scheduling information for the PDSCH associated with the second component carrier is scheduling information for the second data.

* * * * *